United States Patent
Howe et al.

(10) Patent No.: US 6,722,871 B1
(45) Date of Patent: Apr. 20, 2004

(54) APPARATUS FOR DISPENSING FOOD PRODUCTS

(75) Inventors: David J. Howe, Batavia, OH (US); William A. Johnson, Holliston, MA (US)

(73) Assignee: Jim Dandy, Inc., Mansfield, AR (US)

( * ) Notice: Subject to any disclaimer, the term of this patent is extended or adjusted under 35 U.S.C. 154(b) by 0 days.

(21) Appl. No.: 09/783,892

(22) Filed: Feb. 14, 2001

(51) Int. Cl.[7] ................................................. A23G 9/28
(52) U.S. Cl. ........................ 425/187; 425/276; 425/279; 425/280
(58) Field of Search ................................ 425/187, 276, 425/279, 280, 333

(56) References Cited

U.S. PATENT DOCUMENTS

| | | | | |
|---|---|---|---|---|
| 1,638,134 A | * | 8/1927 | Whiteside | 425/276 |
| 2,534,782 A | * | 12/1950 | Maddux | 222/80 |
| 4,796,784 A | * | 1/1989 | Spirk et al. | 222/80 |
| 5,385,464 A | * | 1/1995 | Anderson | 425/276 |

* cited by examiner

Primary Examiner—James P. Mackey
(74) Attorney, Agent, or Firm—Haverstock, Garrett & Roberts LLP

(57) ABSTRACT

The present invention includes a device for dispensing food products such as ice cream, yogurt, sherbet, sorbet, whipped topping, cheesecake filling, pudding and the like comprising a scoop having a channel portion with a tapered, semi-circular cross section along a curved axis. The scoop is designed to be mounted on or adjacent to a container of food product and to extend substantially across one half of the opening of the container. The scoop may be mounted to the container with the smaller cross-sectional area mounted adjacent to the sidewall of the container and with the larger cross-sectional area mounted proximate the center of the container. Alternatively, the scoop may be mounted with the larger cross-sectional area adjacent the sidewall and with the smaller cross-sectional area mounted proximate the center of the container. The cross-sectional area of the channel portion in either case is tapered from end to end. The channel has a leading edge and a trailing edge, one of which extends outwardly more than the other to engage and scoop product from the container into the channel portion during relative movement between the scoop and the container. The scoop is moved or rotated relative to the container with the outwardly extending edge engaging and removing product therefrom. As the exposed layer of food product is scraped up by the scoop, it is guided into the channel and toward an opening in the portion of the scoop having the larger cross-sectional area. The product is dispensed using product forming means to gather the product as it moves through the opening in the scoop and forms it into the desired shape and size for serving.

21 Claims, 5 Drawing Sheets

Fig. 1.1

APPARATUS FOR DISPENSING FOOD PRODUCTS

TECHNICAL FIELD

This invention relates generally to the apparatus for dispensing food products and, more particularly, to an ice cream dispensing assembly rotatably mounted to a container of food product.

BACKGROUND ART

In dispensing food products to be consumed by humans, it is desirable to have means for handling and serving the product in a manner that reduces possible contamination by germs and bacteria. Where food products are sold to the public at a fixed cost per serving, it is also desirable to dispense consistently sized serving portions. In order to retain the volume and texture of frozen products such as ice cream, sherbet, and yogurt, the product is ideally dispensed in a manner that does not compress the particles of air suspended in the frozen product.

There are several devices currently available for dispensing semi-frozen or soft-serve food products such as ice cream, frozen yogurt, whipped topping, cheesecake filling, and pudding. In many of these devices, the product is poured into the machine in its liquid state and chilled to a temperature that allows the product to be dispensed through a nozzle in a soft-serve state. There are several drawbacks with these devices including their inability to dispense food products that are frozen to a firmer state and the inability to automatically dispense consistently sized serving portions. Additionally, food product is often wasted when using these devices because unused product must be emptied periodically in order to clean the machine with a sanitizing solution. The product emptied from the machine is also generally not reusable.

Ice cream and other frozen food products that are frozen to a firm or hard state are often dispensed by hand using an implement such as a curved spatula or scoop. This manual process is slow, difficult, labor-intensive, and exposes the product to risk of contamination. It is also difficult to control the quantity of product dispensed per serving. U.S. Pat. No. 5,385,464 issued to Anderson teaches an apparatus for automatically dispensing hard ice cream that includes a conveyor mechanism for dispensing a predetermined quantity of food product. One drawback to the Anderson device, however, is that the conveyor mechanism compresses the frozen ice cream during delivery, thereby reducing the volume and changing the texture of the dispensed product. Another drawback is that the Anderson device is only designed for use with three gallon tubs and is not adaptable to various sizes and types of containers. It is further desirable to have a device which may be fitted to a container during manufacture or after the food product is placed in the container, and is disposable after use to reduce the possibility of food contamination.

Accordingly, the present invention is directed to fulfilling these needs and overcoming one or more of the problems as set forth above.

DISCLOSURE OF THE INVENTION

The present invention for dispensing food products such as ice cream, yogurt, sherbet, sorbet, whipped topping, cheesecake filling, pudding and the like, comprises an assembly designed to be mounted on and adjacent to a container of food product and to extend substantially across one half of the opening of the container. A removal portion of the assembly includes a retrieval arm with a lateral projection that has a longitudinal channel formed therealong between a shorter leading edge and a deeper trailing edge. In its preferred form, the channel has a tapered, generally semi-circular cross section with a smaller cross-sectional area adjacent the sidewall of the container and a larger cross-sectional area proximate to the center of the container. The assembly may be rotatable around the container with the trailing edge engaging the exposed layer of the food product. As the trailing edge cuts into the exposed layer of the food product, a thickness of the food product is cut away and is scraped up by the trailing edge of the retrieval arm, and the scraped up product is guided within the semi-circular channel and moved toward an opening or compartment at end of the channel having the larger cross-sectional area. Because of the shape of the channel formed by the leading and trailing edges, the scraped layer of food product, when guided through the channel, tends to roll back on itself and reaches the opening or compartment in a generally spherical shape. The product is dispensed using product forming means or a collection component to gather the product as it moves from the channel through the opening or compartment into the collection component, and forms it into the desired shape and size for the serving. After the product exits the collection compartment and enters the collection component, it can be expelled by the dispensing portion into a suitable holder.

The assembly is mounted so that the trailing edge of the retrieval arm engages the exposed layer of product. The assembly is attached to one end, the open end, of the container. The container may be fitted with a movable portion at the opposite end of the container so that as force is exerted on the moveable portion it pushes the product toward the assembly as it rotates and continues to remove the exposed layer of product. With this configuration, the trailing edge of the assembly remains engaged with product as the exposed layer is dispensed.

The assembly may be rotated by various means including manually, or with a drive mechanism such as a belt or a gear and sprocket assembly. Alternatively, the container may rotate while the assembly remains essentially stationary. Serving portions are controlled by the size of the channel in the assembly, the depth of the trailing edge engaged with the product, the number of rotations of the assembly around the container, and the forming and dispensing means.

BRIEF DESCRIPTION OF THE DRAWINGS

FIG. 1.1 is a cross-sectional view of the removal portion showing the relative heights of the leading and trailing edges of the channel;

BEST MODE FOR CARRYING OUT THE INVENTION

Figure 1:
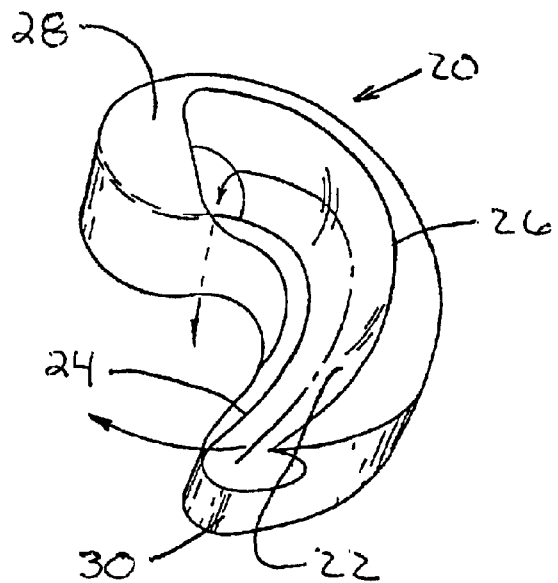
FIG. 1 is a perspective view of the removal portion of the present invention showing a curved channel portion.

Referring to the drawings, FIG. 1 shows a first side of a removal portion 20 having a curved channel 22 with a semi-circular cross-section. The channel 22 has a leading edge 24 and a trailing edge 26 as best shown in FIG. 1.1 wherein the trailing edge 26 extends outwardly further than the leading edge 24. When the first side of the removal portion 20 is mounted on a container of food product such as ice cream, yogurt, sherbet, and sorbet, the trailing edge 26 engages the product, and the expanse of removal portion 20 acts as a retrieval arm to cut away and scrape off the exposed layer of the product as the removal portion 20 and the container rotate relative to one another. The retrieval arm feeds the scraped off product into and along the channel 22. The semi-circular channel 22 guides the product so that it rolls around itself in the channel 22 as the exposed layer of the product is scraped off. The leading edge 24 of the channel 22 may be curved inwardly to promote rolling of the product and to help retain the layer of product scraped off by the retrieval arm within the channel 22.

As shown in FIG. 1, the generally semi-circular channel 22 is tapered having its larger diameter near first end portion 28 and its smaller diameter near second end portion 30 of the removal portion 20. The taper associated with the channel 22 serves to further guide the product in the channel 22 toward the first or larger end portion 28 of the removal portion 20 as the product fills the small end of the taper and expands toward the larger end portion 28. In addition, FIG. 1 shows the channel 22 having a partially closed portion near the first end or the larger end portion of the channel. The removal portion 20 and the channel 22 are shown in FIG. 1 as being curved along their lengths. The curvature may be varied in different embodiments of the removal portion 20, and may even be substantially straight, along the length of one or both sides of the removal portion 20 and/or the channel 22.

Figure 2:
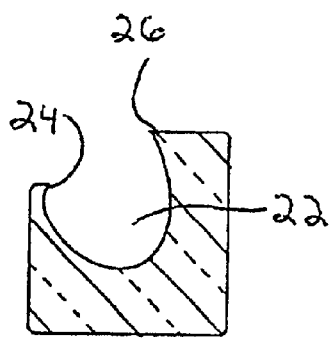
FIG. 2 is a perspective view of the present invention showing an opening or compartment at the end of the channel.
Figure 2:
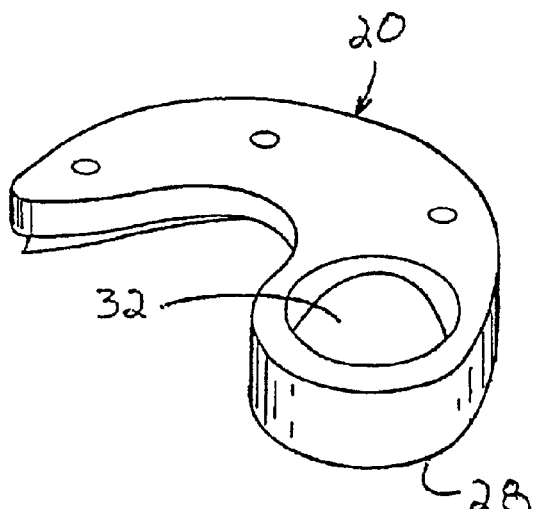
Figure 3:
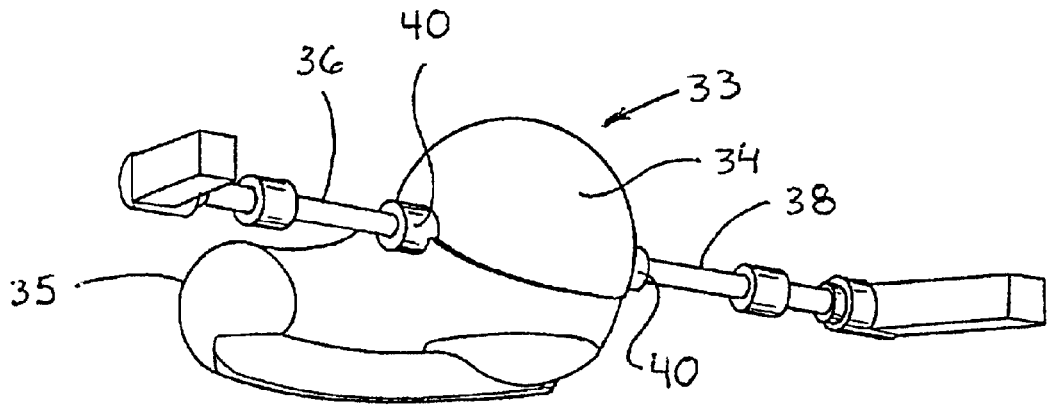
FIG. 3 is a perspective view of one embodiment of a forming and dispensing portion including the collection component.
Figure 4:
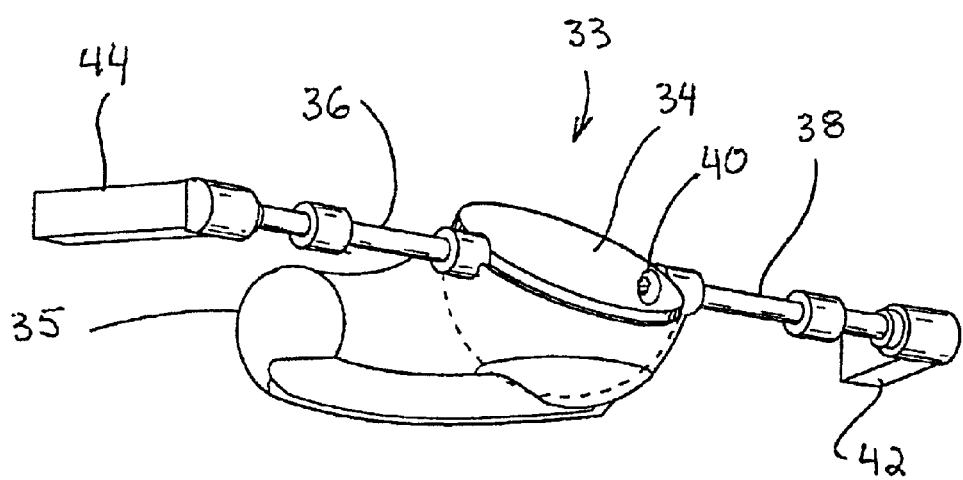
FIG. 4 is a perspective view showing the forming or collection component in the dispensing position.

FIG. 2 shows a second side of the removal portion 20 that is opposite the side with the open channel 22 in FIG. 1. As the product is guided through the channel, it rolls back around on itself, and it emerges through an opening or collection compartment 32 that is generally spherically shaped at the end portion 28 of the removal portion 20. As the product emerges from the removal portion 20, it enters the collection component 34 positioned adjacent the opening or collection compartment 32 at the end of channel 22 of the removal portion 20. FIGS. 3 and 4 show an example of a forming and dispensing portion 33 including a collection component 34 in the shape of a semi-spherical cup sized to fit in the opening or compartment 32 at the end of the removal portion 35. The interior of the collection compartment 32 has a generally spherical shape to accommodate and house the collection component 34. In the example shown in FIGS. 3 and 4, rotatable bar members 36, 38 are fastened respectively to opposite sides of the cup or collection component 34. The means for fastening the bar members 36, 38 on either side of the cup or collection component 34 can include a screw or a rivet 40 passing through the side of the cup or collection component 34 and the removal portion 35 to engage one end of the bar members 36, 38. A handle 42, 44 or motor is or may be attached to the other end of each of the bar members 36, 38 to aid rotation of the bar members 36, 38.

FIG. 3 shows the concave side of the cup or collection component 34 positioned over the opening or compartment 32 at the end of the removal portion 35 to receive the product as it emerges from the opening or compartment 32. Once the cup or collection component 34 is filled, the operator can rotate either bar member 36 or 38 thereby rotating an edge of the cup or collection component 34 through the product to obtain the desired serving portion. When the cup or collection component 34 is rotated so that the concave side of the cup or collection component 34 is facing outwardly, the operator may remove the product from the cup or collection component 34 and place it into the desired receptacle such as an ice cream cone. The forming and dispensing portion 33 may include means (not shown) for releasing the product from the cup or collection component 34 as found in various ice cream cups and other food dispensing apparatus in the prior art.

The present invention may be used with various types of forming and dispensing portions. The collection component and forming and dispensing portion shown in FIGS. 3 and 4 are shown solely to illustrate one embodiment for collecting, forming and dispensing a desired quantity of product. Other collection components and forming and dispensing portions may be used in conjunction with the present removal portion 35. For example, cups having a various shape may be positioned to receive the product as it emerges from the opening or compartment 32 in the removal portion 35. Means such as a knife or spatula (not shown) may also be used to cut through the product between the cup or collection component 34 and the opening or compartment 32 at the end of the removal portion 35. If the cup or collection component has a shape that prevents it from being rotated within the opening 32 of the removal portion 35, then it may be pivotally attached adjacent to the opening in the removal portion 35 to allow access to the product in the collection component.

There are a number of ways to facilitate rotating or moving the removal portion 35 through the product which may be used alone or in combination with one another. One alternative is to embed one or more heating elements (not shown) in the removal portion, and/or in the forming or dispensing portion, to heat them during the product removal, collection, forming, and dispensing process. Another alternative is to use non-stick coatings on the various components of the apparatus. Yet another alternative is to embed or attach one or more heat conductive strips or particles at desired locations on the assembly such as along the leading edge, or within the semi-circular channel. The operation of any heating device can be controlled depending on the movement of the assembly or container to prevent unnecessary melting of the product.

Figure 5:
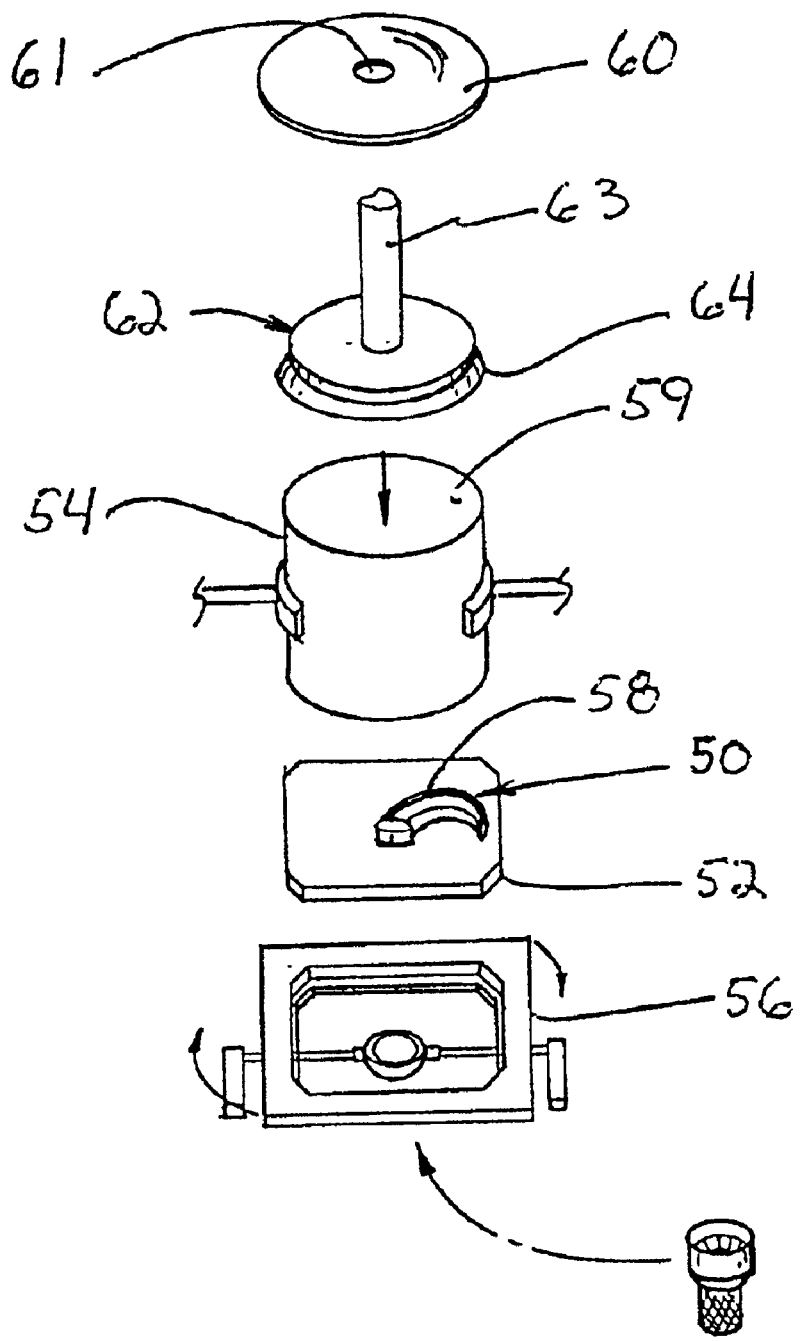
FIG. 5 is an exploded perspective view of the various components associated with the assembly of the present invention mounted adjacent to a container of frozen product.

FIG. 5 shows an assembly of the removal portion 50 mounted to a platform 52 that is built into or otherwise fixedly attached to a lid structure 56 that fits over an open end of a container 54 of frozen product such as ice cream. Alternatively, the removal portion 50 may be formed as an integral part of the lid 56. Any size or shape of container 54 may be used with the present invention, however, a round container 54 with a radius similar to the length to of the removal portion 50 results in most of the product being accessible for dispensing as the removal portion 50 and the container 54 are rotated relative to one another.

As shown in FIG. 5, the removal portion 50 is mounted in the platform 52 or formed in the lid 56 so that the edge 58 of the removal portion 50 engages the exposed layer of the product when the lid 56 is positioned over or against the container 54. The lid 56 may be sealed, clamped, or otherwise fixedly attached to the container 54 using any suitable means. It is important for the removal portion 50 to be attached to the lid 56 in a manner that allows the removal portion 50 or the removal portion 50 and the lid 56 combination to rotate around the open end of the container 54. Alternatively the open container 54 can rotate around the removal portion 50 or the removal portion 50 and lid 56 combination.

As the removal portion 50 and the container 54 are rotated relative to one another, the exposed layer of the product is removed. In order for the trailing edge 58 of the removal portion 50 to remain engaged with the product, the product is pushed toward the removal portion 50. FIG. 5 shows the container 54 having an example of means for moving the product in the container 54 toward the removal portion 50. The end 59 of the container 54 opposite the removal portion 50 has a cover 60 with a central access port 61 to allow force to be applied to a plunger 62 that has rod 63 and from there to the plunger 62. A seal 64 may be included around the edge of the plunger 62 that scrapes the product from the sidewall of the container 54 as the plunger 62 moves, to reduce waste of the product. The plunger and related parts may be disposed of along with the container 54 after the food product is removed from the container 54. Alternatively, the plunger 62 and the adjacent end cover 60 may be removable for use with another container 54 or to allow the container 54 to be refilled with food product.

In alternative embodiments, the removal portion 50 may remain stationary and the container 54 may be rotated. Additionally, the means for keeping the trailing edge 58 of the removal portion 50 engaged with the product could include means for pushing the removal portion 50 toward the product during rotation.

Figure 6:
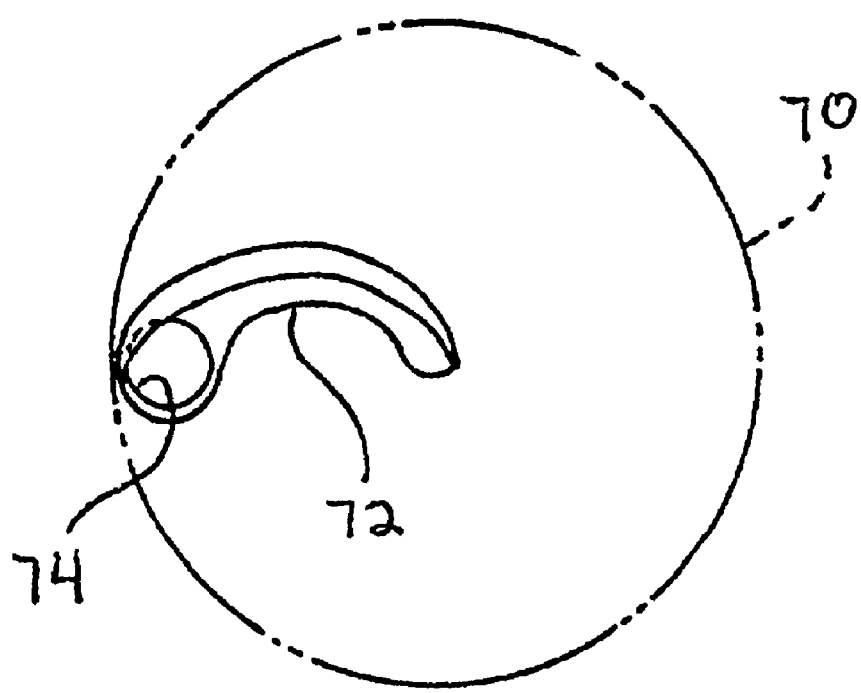
FIG. 6 is a perspective view of the assembly in an alternate position with respect to a container.

FIG. 6 shows an alternative position of a removal portion 72 which is located adjacent to a container 70 that rotates. The removal portion 72 is mounted so that the opening or compartment 74 is adjacent to the outer edge rather than the center of the container 70. The product moves toward the opening or compartment 74 as the container 70 rotates and the exposed layer of product is removed by the removal portion 72. A collection component and forming and dispensing portion such as that discussed hereinabove, may then be positioned near the edge of the container 70.

The orientation of the removal portion, the container, the collection component, and the forming and dispensing portion may vary depending on the needs of the user. For instance, the removal portion may be oriented with the side containing the channel facing upwardly, downwardly, to the side, or at any angle in between. The orientation of the container, collection component and the forming and dispensing portion depend on the orientation of the removal portion. The trailing and/or leading edge of the retrieval arm of the removal portion may also be tapered from one side to the other to engage and remove more product. Further, the removal portion may be oriented at an angle with respect to the exposed layer of product in the container depending on the particular application of the present invention.

The amount of product dispensed is controlled by the number of rotations of the removal portion or container relative to each other, the depth of the cutting or trailing edge of the removal portion, the cross-sectional area of the channel, the forming and dispensing means and the texture or consistency of the product. The present assembly may be used with a variety of frozen or semi-frozen products including those containing solid particles such as crushed cookies, and is especially useful for products that are frozen at temperatures between plus and minus 10° F. At these temperatures, products such as ice cream, yogurt and sherbet are in a "hard freeze" state and are difficult to scoop by hand. Further, products at these temperatures contain suspended air particles that form during the freezing process and are important to the texture and appearance of the product. The present assembly is designed to dispense consistently sized serving portions so that the desired number of servings expected from large containers is known in advance and are delivered. The present assembly is adaptable to various types of containers that are used to distribute commercial quantities of food product.

The present assembly may be manufactured from several types of materials including various plastic and metallic compounds. One important aspect of the present assembly is that it may be used to improve sanitation in retail and commercial applications by reducing contact between the operator and the products. This is accomplished by installing the assembly and/or any related assemblies with the container before it is distributed, and disposing of the assembly along with the container once the product is emptied from the container. Since the assembly does not have to be re-used, problems associated with improper cleansing and transferring contaminated implements from one container to another are avoided. Further, use of the present assembly reduces manual handling of the product, thereby reducing the risk of product contamination by humans.

Figure 7:
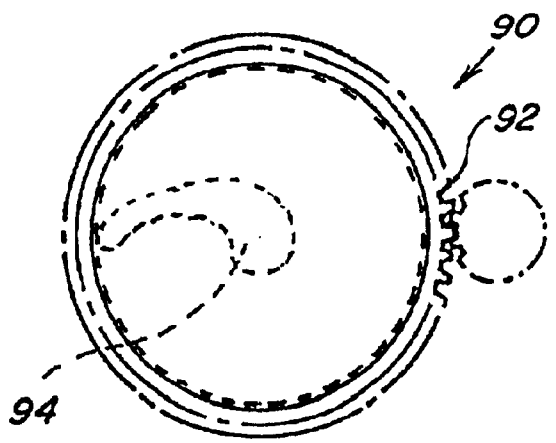
FIG. 7 is a top view of an example of means for rotatably mounting the assembly adjacent the container.
Figure 8:
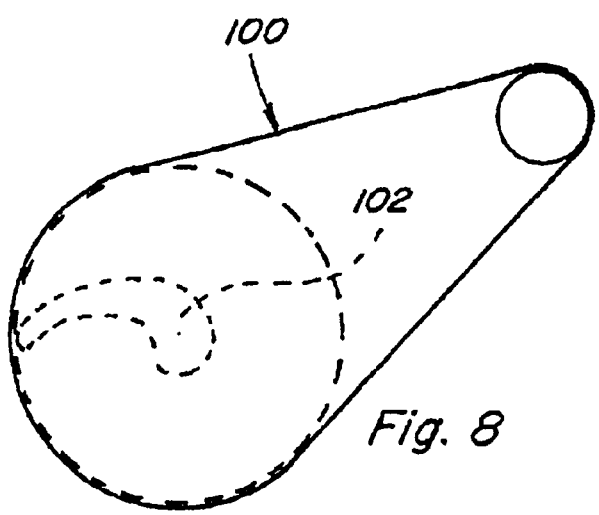
FIG. 8 is a top view of another example of means for rotatably mounting the assembly adjacent the container.

FIGS. 7 and 8 show alternate means for rotating the assembly or the container. FIG. 7 shows a conventional, motorized gear and sprocket mechanism 90 wherein the gearing 92 may be attached to the edge of a lid containing the removal portion 94. Alternatively, the gearing may be attached to the container, depending on whether the assembly or the container is to be rotated. FIG. 8 shows a conventional motorized belt drive mechanism 100 attached to the lid containing removal portion 102 that may be used to rotate the assembly or the container. Further, the assembly or the container may be rotated manually using an external handle.

Other aspects, objects and advantages of the present invention can be obtained from a study of the drawings, the disclosure and the amended claims.

What is claimed is:

1. A frozen food product dispensing assembly for removing frozen food product from a container, comprising:

a removal portion having first and second sides and sized and configured to be disposed with said first side adjacent the open end of a container extending into the container at said first side, including a retrieval arm on said first side of the removal portion including a leading edge, a trailing edge, a closed curvilinear surface extending between said leading and trailing edges, said leading and trailing edges and said closed curvilinear surface forming a channel having an outer end and an inner terminus, said trailing edge projecting deeper into the container than said leading edge, said leading edge and said trailing edge configured to engage frozen food product in the container and to direct a thickness of frozen food product into said channel to roll the thickness of frozen food product around itself as the frozen food product is moved along from said outer end of said channel to said inner terminus of said channel as said retrieval arm and the open end of the container are rotated relative to one another, and a collection compartment at the inner terminus at said channel, said collection compartment disposed on said first side of said removal portion and adjacent said inner terminus of said channels, said collection compartment having an at least partially closed outer wall on said first side of said removal portion, an open side directed towards said second side of said removal portion, an interior wall, and an opening thereinto from said channel of said retrieval arm, whereby the frozen food product engaged by said retrieval arm as said retrieval arm and the container are rotated relative to one another is fed through said opening into said collection compartment, said collection of frozen food product within said collection compartment as said retrieval arm is rotated relative to the container occurring along said first side of the removal portion.

2. The frozen food product dispensing assembly of claim 1 further comprising:

a dispensing portion including a collection component having a shape generally conformable to said interior wall of said collection compartment and positionable during its operation to generally abut at least a portion of said interior wall as to receive frozen food product transported thereto, as such frozen food product is fed through said opening of said collection compartment, said dispensing portion operable to engage frozen food product received by said collection component and to expel the frozen food product from said collection component through said open side of said collection compartment, and an operator actuatable assembly connected to said dispensing portion and operable to effect the positioning of said collection component relative to said interior wall of said at least partially closed outer wall of said collection compartment and the expulsion of the frozen food product collected in said collection component.

3. The assembly of claim 1 wherein said retrieval arm extends laterally along said removal portion and is curved and tapered.

4. The assembly of claim 1 wherein said removal portion and said collection compartment comprise an integral unit.

5. The assembly of claim 4 wherein said integral unit is a molded unit.

6. The assembly of claim 1 wherein said assembly is rotatable while the frozen food product container is held stationary.

7. The assembly of claim 1 wherein the frozen food product container is rotatable while said assembly is held stationary.

8. The assembly of claim 1 wherein said assembly and the open end of the container are movable towards one another, whereby said retrieval arm of said assembly remains engaged with the topmost layer of frozen food product in the container.

9. The assembly of claim 1 wherein said trailing edge of said retrieval arm is a tapered cutting edge.

10. The assembly of claim 1 wherein said channel tapers along the length and the narrower end of said channel is adjacent the side of the frozen food container.

11. The assembly of claim 1 wherein said channel is concave.

12. The assembly of claim 1 wherein the cross-section of said channel is generally semi-circular.

13. The assembly of claim 1 wherein said removal portion includes a heating element.

14. The assembly of claim 2 wherein said dispensing portion includes a heating element.

15. The assembly of claim 2 wherein a non-stick coating is placed on said leading edge, said trailing edge, said channel, and said collection component.

16. An ice cream dispensing device comprising a removal portion including a upper side configured to be disposed generally perpendicular to and extending across at least a portion of the open end of an ice cream container, a retrieval arm portion depending from said upper side to project into an ice cream container and to extend generally curvilinearly across at least a portion of the open end of the ice cream container, said retrieval arm having an outer end, an inner end, leading and trailing edges extending laterally along said retrieval arm between said outer and inner ends thereof, an elongated channel disposed and extending laterally along said retrieval arm between said leading and trailing edges, and a collection compartment at said inner end of said retrieval arm, said trailing edge configured to project into an ice cream container to a greater depth than said leading edge, said trailing and leading edges and channel therebetween defining a generally C-shaped cross-section for said channel, said cross-section of said channel expanding along its length from said outer end of said retrieval arm towards said collection compartment at said inner end of said retrieval arm, said collection compartment including an at least partially closed side adjacent the terminus of said trailing edge, an entry opening into said collection component from said channel, an interior wall, and an exit opening at said upper side of said removal portion, the interior of said collection compartment having a generally spherical shape, said removal portion being rotatable relative to the ice cream container as the retrieval arm portion is brought into contact with ice cream in the ice cream container whereby the relative movement of said removal portion and the ice cream container thereafter causes said trailing edge to cut into a layer of ice cream to feed the cut layer of ice cream into said channel to roll therein and therealong to said collection compartment, and an operator controlled dispensing portion responsive to operator actions to effect the ejection of ice cream from said collection compartment through said exit opening at said upper side of said removal portion.

17. The ice cream dispensing device of claim 16 including a mounting assembly for mounting the ice cream container and said ice cream dispensing device relative to one another for rotational movement.

18. The ice cream dispensing device of claim 16 wherein said dispensing portion includes a member having a movable portion sized and configured to be brought into close abutment with at least a portion of said interior wall of said collection compartment and an operator actuatable mechanism associated therewith and responsive to actuation by a user to effect ejection of ice cream from said collection compartment by movement under operator control of said movable portion of said member into and away from close abutment with at least a portion of said interior wall of said collection compartment.

19. The ice cream dispensing device of claim 18 wherein said upper side of said removal portion includes a disc-like portion sized and dimensioned to cover a substantial portion of the open end of the ice cream container.

20. The ice cream dispensing device of claim 19 wherein said collection compartment is-disposed below said upper side of said removal portion and said dispensing portion includes a mounting portion disposed above said disc-like portion of said removal portion and operatively connected to said movable portion of said dispensing portion to effect movement of said movable portion into and out of said collection compartment.

21. The ice cream dispensing device of claim 16 wherein said trailing edge has an edge for engaging and cutting the ice cream in the container.

* * * * *